US012617253B2

(12) United States Patent
Suzuki

(10) Patent No.: US 12,617,253 B2
(45) Date of Patent: May 5, 2026

(54) THERMAL MANAGEMENT SYSTEM

(71) Applicant: TOYOTA JIDOSHA KABUSHIKI KAISHA, Toyota (JP)

(72) Inventor: Tomoaki Suzuki, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 182 days.

(21) Appl. No.: 18/408,850

(22) Filed: Jan. 10, 2024

(65) Prior Publication Data

US 2024/0300290 A1 Sep. 12, 2024

(30) Foreign Application Priority Data

Mar. 9, 2023 (JP) ................................. 2023-036619

(51) Int. Cl.
*B60H 1/00* (2006.01)

(52) U.S. Cl.
CPC ..... *B60H 1/00885* (2013.01); *B60H 1/00278* (2013.01); *B60H 1/00392* (2013.01); *B60H 1/00485* (2013.01); *B60H 1/00792* (2013.01); *B60H 1/00871* (2013.01); *B60H 2001/00307* (2013.01); *B60H 2001/00957* (2013.01); *Y02E 60/10* (2013.01)

(58) Field of Classification Search
CPC ............ B60H 1/00885; B60H 1/00278; B60H 1/00392; B60H 1/00485; B60H 2001/00307; B60H 2001/00957; F25B 2313/0276; H01M 10/625
USPC ......................................................... 165/287
See application file for complete search history.

(56) References Cited

U.S. PATENT DOCUMENTS

| | | | | |
|---|---|---|---|---|
| 5,634,352 A * | 6/1997 | Nagai | ..................... | F25B 13/00 |
| | | | | 62/278 |
| 8,232,079 B2 * | 7/2012 | Deguchi | ................. | C12P 19/30 |
| | | | | 536/124 |
| 10,253,992 B2 * | 4/2019 | Song | ........................ | F24F 3/065 |
| 10,344,877 B2 * | 7/2019 | Roche | ..................... | B60L 1/003 |

(Continued)

FOREIGN PATENT DOCUMENTS

| | | |
|---|---|---|
| JP | 2010-272395 A | 12/2010 |
| JP | 2018-45776 A | 3/2018 |

(Continued)

OTHER PUBLICATIONS

Definition of "drive" from https://www.merriam-webster.com/dictionary/drive (Year: 2026).*

*Primary Examiner* — Jon T. Schermerhorn, Jr.
(74) *Attorney, Agent, or Firm* — OLIFF PLC

(57) ABSTRACT

A thermal management system includes: a first flow path, a second flow path, a third flow path, and a fourth flow path; an electrical storage device configured to exchange heat with a heat medium in the first flow path; a drive device configured to exchange heat with a heat medium in the second flow path; a radiator provided on the third flow path; a chiller device provided on the fourth flow path; and a switching device configured to switch a connection state between the first to the fourth flow path. The switching device is configured to provide a heating circuit. The heating circuit is a flow path circuit in which a connection flow path connecting the first flow path, the third flow path, and the fourth flow path and the second flow path are disconnected from and independent of each other.

9 Claims, 11 Drawing Sheets

(56)  References Cited

U.S. PATENT DOCUMENTS

| 10,837,680 | B2 * | 11/2020 | Nishiyama | F25B 41/40 |
|---|---|---|---|---|
| 10,845,099 | B2 * | 11/2020 | Nishiyama | F25B 39/028 |
| 11,365,914 | B2 * | 6/2022 | Tanaka | F25B 13/00 |
| 12,083,856 | B2 * | 9/2024 | He | B60H 1/00485 |
| 2021/0309075 | A1 | 10/2021 | Hasegawa | |
| 2022/0134839 | A1 * | 5/2022 | He | B60H 1/00485 |
| | | | | 165/203 |
| 2024/0300320 | A1 * | 9/2024 | Suzuki | B60K 11/085 |
| 2024/0361046 | A1 * | 10/2024 | Tanaka | F25B 41/31 |
| 2025/0003645 | A1 * | 1/2025 | Gyotoku | F25B 25/005 |

FOREIGN PATENT DOCUMENTS

| JP | 2020-87707 A | 6/2020 |
|---|---|---|
| JP | 2021-27797 A | 2/2021 |
| JP | 2021-164332 A | 10/2021 |

* cited by examiner

HEATING CONTROL

THERMAL MANAGEMENT SYSTEM

CROSS-REFERENCE TO RELATED APPLICATION

This application claims priority to Japanese Patent Application No. 2023-036619 filed on Mar. 9, 2023, incorporated herein by reference in its entirety.

BACKGROUND

1. Technical Field

The present disclosure relates to a thermal management system.

2. Description of Related Art

Japanese Unexamined Patent Application Publication No. 2010-272395 (JP 2010-272395 A) discloses an electrified vehicle. The electrified vehicle includes an electrical storage device (battery), an inverter, a motor, and a control device. The electrical storage device is connected to the inverter. The inverter is connected to the motor. The control device controls the current of the electrical storage device by controlling switching of the inverter. The control device thus controls heat that is generated due to power loss in the internal resistance of the electrical storage device. As a result, the control device can perform heating control for increasing the temperature of the electrical storage device using the current of the electrical storage device (self-heating of the electrical storage device).

SUMMARY

In electrical apparatuses such as electrified vehicles, it is sometimes important to effectively use heat from a drive device including an inverter and a motor. Along with this, it is necessary to perform heating of the electrical storage device. That is, it is desired to perform heating of the electrical storage device while allowing effective use of the heat generated by the drive device.

The present disclosure provides a thermal management system that can perform heating of an electrical storage device while allowing effective use of heat generated by a drive device.

A thermal management system according to one aspect of the present disclosure is a thermal management system provided in an electrical apparatus. The thermal management system includes: a first flow path, a second flow path, a third flow path, and a fourth flow path each configured to allow a heat medium to flow through the flow path; an electrical storage device configured to exchange heat with the heat medium in the first flow path; a drive device configured to exchange heat with the heat medium in the second flow path and generate a driving force; a radiator provided on the third flow path; a chiller device provided on the fourth flow path; and a switching device configured to switch a connection state between the first flow path, the second flow path, the third flow path, and the fourth flow path. The switching device is configured to provide a heating circuit when performing heating of the electrical storage device by a current flowing through the electrical storage device. The heating circuit is a flow path circuit in which a connection flow path connecting the first flow path, the third flow path, and the fourth flow path and the second flow path are disconnected from and independent of each other.

In the thermal management system, when performing the heating of the electrical storage device, the connection flow path connecting the first flow path, the third flow path, and the fourth flow path and the second flow path are disconnected from and independent of each other. It is thus possible to reduce or eliminate the possibility that heat generated in the drive device may be taken by the chiller device and the radiator that are unrelated to the heating of the electrical storage device. As a result, it is possible to perform the heating of the electrical storage device while allowing effective use of the heat generated by the drive device.

In the thermal management system, the electrical apparatus may be an electrified vehicle. The electrical storage device may be configured to be heated when a traveling system of the electrified vehicle is activated. With this configuration, the temperature of the electrical storage device can be easily increased when the electrified vehicle starts to travel. As a result, the traveling performance of the electrified vehicle can be easily increased to a certain level or higher when the electrified vehicle starts to travel.

In the thermal management system, the electrical storage device may be configured to be charged from an outside with charging power supplied from charging equipment external to the electrical apparatus. The electrical storage device may be configured to be heated at start of charging from the outside to cause a temperature of the electrical storage device to reach a predetermined temperature or higher. With this configuration, the temperature of the electrical storage device can be easily increased at the start of the charging from the outside. As a result, the charging rate and charging efficiency can be easily increased to a certain level or higher at the start of the charging from the outside. The phrase "at the start of the charging from the outside" means a timing when the charging power begins to be supplied to the electrical storage device.

In the thermal management system, the electrical apparatus may be an electrified vehicle. The chiller device may be configured to exchange heat with an air conditioning circuit configured to adjust a cabin temperature of the electrified vehicle. The switching device may be configured to provide the heating circuit under a condition that an outside air temperature is higher than a predetermined threshold in response to a heating request using the air conditioning circuit when performing the heating of the electrical storage device. With this configuration, the heating can be turned on using outside air whose temperature is higher than the predetermined threshold.

The thermal management system may further include a control device configured to control the switching device. The switching device may include a first six-way valve and a second six-way valve. The first flow path may connect the electrical storage device and the first six-way valve. The second flow path may connect the drive device to each of the first six-way valve and the second six-way valve. The third flow path may connect the radiator and the second six-way valve. The fourth flow path may connect the chiller device to each of the first six-way valve and the second six-way valve. The control device may be configured to control the first six-way valve and the second six-way valve to provide closed circuits in the heating circuit under the condition that the outside air temperature is higher than the predetermined threshold in response to the heating request using the air conditioning circuit when performing the heating of the electrical storage device. The closed circuits may include:

(i) a first closed circuit connecting the third flow path, the first flow path, the fourth flow path, the second six-way valve, and the first six-way valve, the heat medium circulating through the first closed circuit exchanging heat with the chiller device, the radiator, and the electrical storage device; and (ii) a second closed circuit connecting the second flow path, the first six-way valve, and the second six-way valve, the heat medium circulating through the second closed circuit exchanging heat with the drive device.

The thermal management system may further include a control device configured to control the switching device. The switching device may include a first six-way valve and a second six-way valve. The first flow path may connect the electrical storage device and the first six-way valve. The second flow path may connect the drive device to each of the first six-way valve and the second six-way valve. The third flow path may connect the radiator and the second six-way valve. The fourth flow path may connect the chiller device to each of the first six-way valve and the second six-way valve. The control device may be configured to control the first six-way valve and the second six-way valve to provide closed circuits in the heating circuit under a condition that the outside air temperature is not higher than the predetermined threshold in response to the heating request using the air conditioning circuit when performing the heating of the electrical storage device. The closed circuits may include:

(ii) a second closed circuit connecting the second flow path, the first six-way valve, and the second six-way valve, the heat medium circulating through the second closed circuit exchanging heat with the drive device; and (iii) a third closed circuit connecting the first flow path, the fourth flow path, the first six-way valve, and the second six-way valve, the heat medium circulating through the third closed circuit exchanging heat with the chiller device and the electrical storage device.

The thermal management system may further include: a pump provided on the fourth flow path and configured to circulate the heat medium; a first temperature sensor configured to detect a temperature of the electrical storage device; and a second temperature sensor configured to detect a temperature of the heat medium in the first flow path. The pump may be configured to, in a case where the heating request is not given when performing the heating of the electrical storage device with the heating circuit provided: stop when a detected value of the first temperature sensor is higher than a detected value of the second temperature sensor; and operate when the detected value of the first temperature sensor is equal to or lower than the detected value of the second temperature sensor. With this configuration, it is possible to reduce or eliminate the possibility that the electrical storage device may be cooled by the heat medium in the first flow path.

In the thermal management system, the electrical apparatus may be an electrified vehicle. The thermal management system may further include a grille shutter configured to open and close and adjust an amount of heat that is dissipated from the radiator to an outside of the electrified vehicle. The grille shutter may be configured to close when performing the heating of the electrical storage device with the heating circuit provided. With this configuration, it is possible to reduce or eliminate the possibility that heat of the electrical storage device may escape from the grille shutter to the outside.

The thermal management system may further include a control device configured to control the switching device. The switching device may include a first six-way valve and a second six-way valve. The first flow path may connect the electrical storage device and the first six-way valve. The second flow path may connect the drive device to each of the first six-way valve and the second six-way valve. The third flow path may connect the radiator and the second six-way valve. The fourth flow path may connect the chiller device to each of the first six-way valve and the second six-way valve. The control device may be configured to control the first six-way valve and the second six-way valve to provide closed circuits in the heating circuit. The closed circuits may include:

(i) a first closed circuit connecting the third flow path, the first flow path, the fourth flow path, the second six-way valve, and the first six-way valve, the heat medium circulating through the first closed circuit exchanging heat with the chiller device, the radiator, and the electrical storage device;

(ii) a second closed circuit connecting the second flow path, the first six-way valve, and the second six-way valve, the heat medium circulating through the second closed circuit exchanging heat with the drive device; and (iii) a third closed circuit connecting the first flow path, the fourth flow path, the first six-way valve, and the second six-way valve, the heat medium circulating through the third closed circuit exchanging heat with the chiller device and the electrical storage device.

According to the present disclosure, it is possible to perform heating of the electrical storage device while allowing effective use of the heat generated by the drive device.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 3 shows a detailed configuration of the thermal management system according to the embodiment;

FIG. 6 is a flowchart showing heating control that is performed by the thermal management system according to the embodiment;

DETAILED DESCRIPTION OF EMBODIMENTS

An embodiment of the present disclosure will be described in detail below with reference to the drawings. The same or corresponding parts are denoted by the same signs throughout the drawings, and description thereof will not be repeated.

Figure 1:
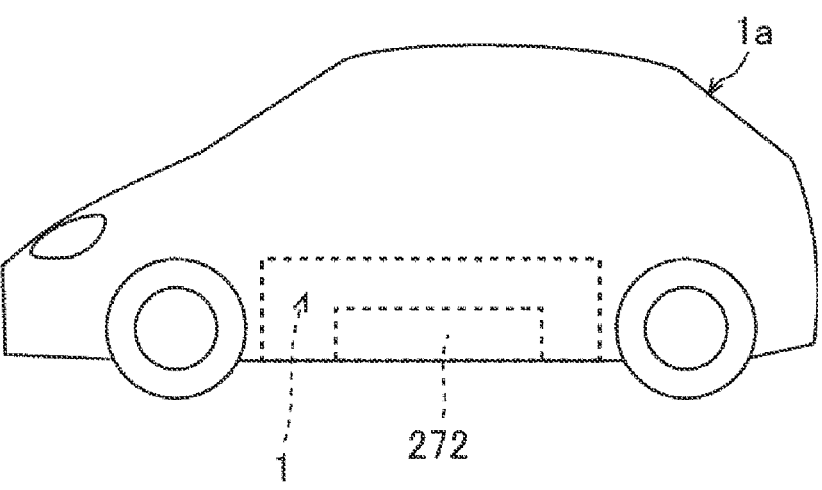
FIG. 1 shows an electrified vehicle on which a thermal management system according to an embodiment is mounted.

Hereinafter, a configuration in which a thermal management system according to the present disclosure is provided in an electrified vehicle 1a (see FIG. 1) will be described as an example. The electrified vehicle 1a is preferably a vehicle equipped with a battery 272 for traveling, and is, for example, a battery electric vehicle (BEV). The electrified vehicle 1a may be a hybrid electric vehicle (HEV), a plug-in hybrid electric vehicle (PHEV), or a fuel cell electric vehicle (FCEV). However, the thermal management system according to the present disclosure is not limited to vehicle applications. The electrified vehicle 1a is an example of the "electrical apparatus" of the present disclosure.

Overall Configuration

Figure 2:
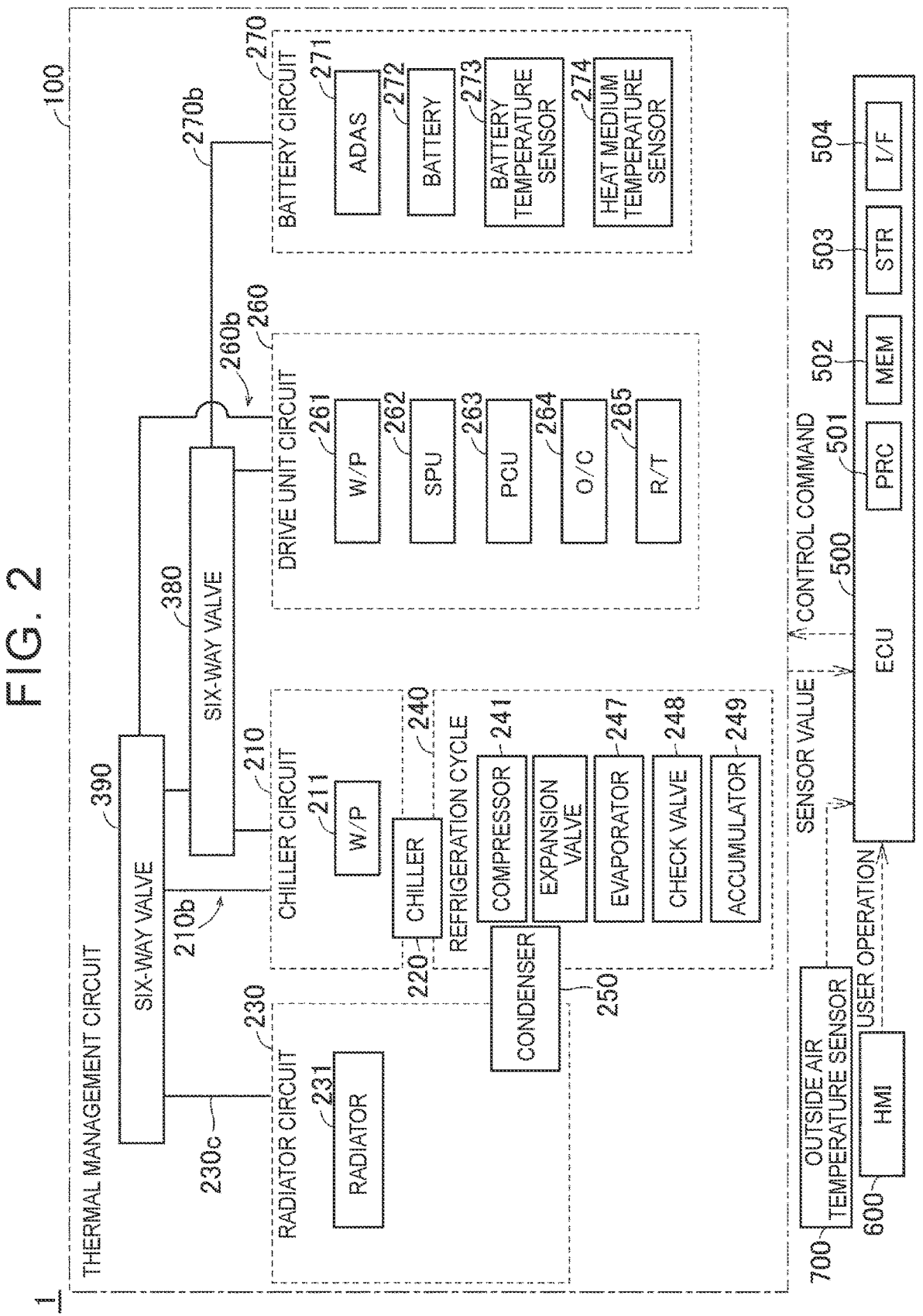
FIG. 2 shows the configuration of the thermal management system according to the embodiment.

FIG. 2 shows an example of the overall configuration of a thermal management system 1 according to the embodiment of the present disclosure. The thermal management system 1 includes a thermal management circuit 100, an electronic control unit (ECU) 500, a human machine interface (HMI) 600, and an outside air temperature sensor 700.

The thermal management circuit 100 includes, for example, a chiller circuit 210, a chiller 220, a radiator circuit 230, a refrigeration cycle 240, a condenser 250, a drive unit circuit 260, a battery circuit 270, a six-way valve 380, and a six-way valve 390. The six-way valves 380, 390 are examples of the "switching device" of the present disclosure. The chiller 220 and the refrigeration cycle 240 are examples of the "chiller device" and the "air conditioning circuit" of the present disclosure, respectively.

The chiller circuit 210 includes a water pump (W/P) 211. The chiller 220 is connected to (shared by) both the chiller circuit 210 and the refrigeration cycle 240. The water pump 211 is an example of the "pump" of the present disclosure.

The radiator circuit 230 includes a radiator 231. The refrigeration cycle 240 includes, for example, a compressor 241, an electromagnetic valve 242 (see FIG. 3), electromagnetic valves 244A, 244B, 245, and 246 (see FIG. 3), an evaporator 247, a check valve 248, and an accumulator 249. The condenser 250 includes a water-cooled condenser 251 and an air-cooled condenser 252 (see FIG. 3), and the water-cooled condenser 251 is connected to both the refrigeration cycle 240 and the radiator circuit 230.

The drive unit circuit 260 includes, for example, a water pump 261, a smart power unit (SPU) 262, a power control unit (PCU) 263, an oil cooler (O/C) 264, and a reservoir tank 265. Instead of the oil cooler 264, a transaxle may be provided in the drive unit circuit 260. Alternatively, the PCU 263 and the oil cooler 264 (or the transaxle) may be combined into an e-axle. The PCU 263 and the oil cooler 264 are examples of the "drive device" of the present disclosure.

The battery circuit 270 includes, for example, advanced driver-assistance systems (ADAS) 271, a battery 272, a battery temperature sensor 273, and a heat medium temperature sensor 274. The battery 272 is an example of the "electrical storage device" of the present disclosure. The battery temperature sensor 273 and the heat medium temperature sensor 274 are examples of the "first temperature sensor" and the "second temperature sensor" of the present disclosure, respectively. The battery circuit 270 (battery 272) may include a ripple heating circuit that heats the battery 272 using a ripple component of a current flowing through the battery 272.

Figure 3:
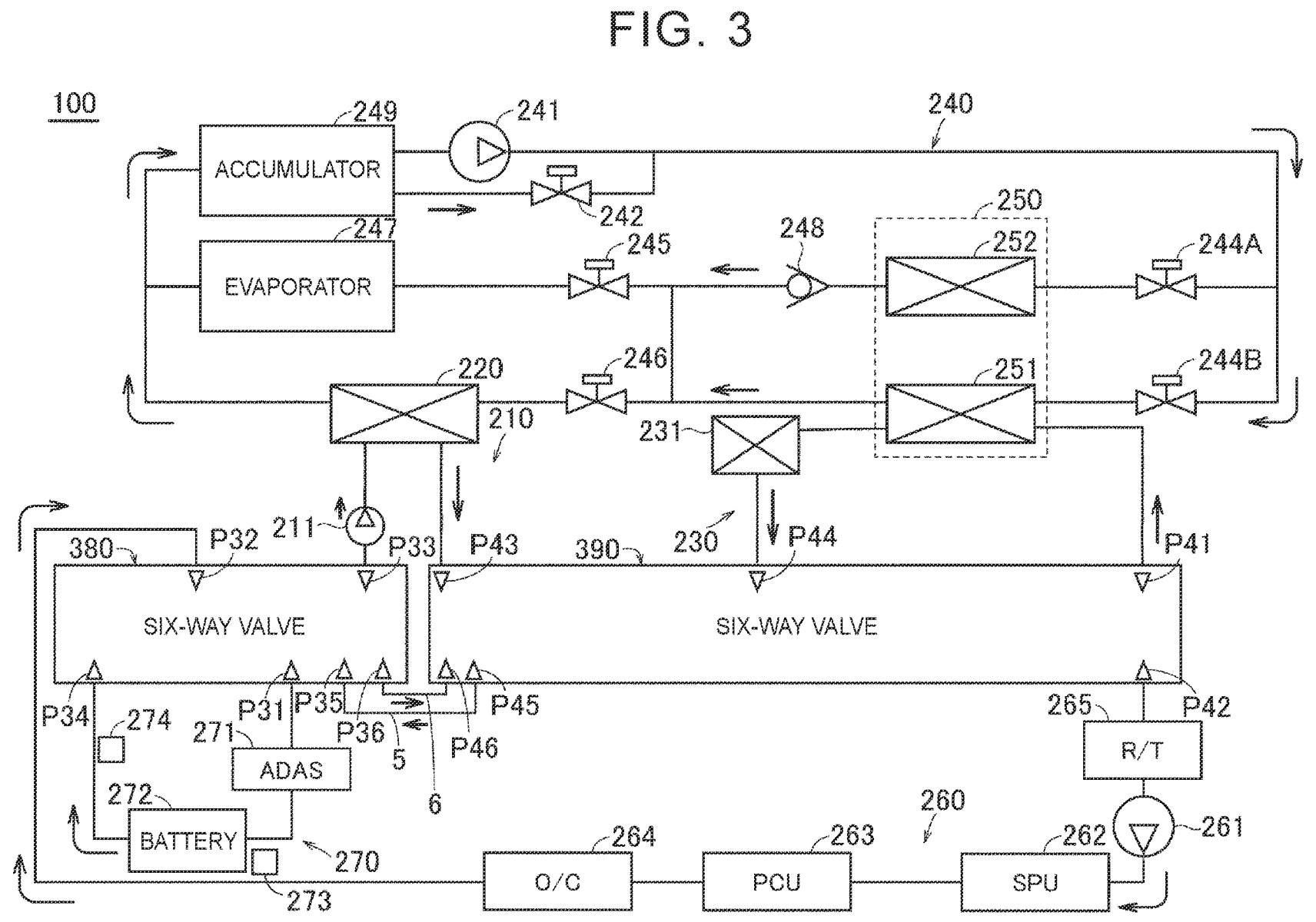

The six-way valve 380 includes six ports P31 to P36 (see FIG. 3). The six-way valve 390 includes six ports P41 to P46 (see FIG. 3). The six-way valve 380 is connected to the chiller circuit 210, the drive unit circuit 260, and the battery circuit 270. The six-way valve 390 is connected to the chiller circuit 210, the drive unit circuit 260, and the radiator circuit 230.

The chiller 220 is provided in a flow path 210b of the chiller circuit 210. The flow path 210b connects the chiller circuit 210 and each of the six-way valves 380, 390. The chiller 220 exchanges heat between the heat medium flowing in the flow path 210b and the heat medium circulating in the refrigeration cycle 240. The flow path 210b is an example of the "fourth flow path" of the present disclosure.

The radiator 231 is provided on a flow path 230c. The flow path 230c connects the radiator 231 and the six-way valve 390. The radiator 231 exchanges heat between the heat medium flowing in the flow path 230c and outside air. The flow path 230c is an example of the "third flow path" of the present disclosure.

The water pump 261, the SPU 262, the PCU 263, the oil cooler 264, and the reservoir tank 265 are provided in a flow path 260b of the drive unit circuit 260. The flow path 260b connects the drive unit circuit 260 and each of the six-way valves 380, 390. The PCU 263, the oil cooler 264, etc. exchange heat with the flow path 260b (the heat medium in the flow path 260b). The flow path 260b is in thermal contact with the SPU 262, the PCU 263, and the oil cooler 264. The flow path 260b is an example of the "second flow path" of the present disclosure.

The ADAS 271 and the battery 272 are provided in a flow path 270b of the battery circuit 270. The flow path 270b connects the battery circuit 270 and the six-way valve 380. The battery 272 exchanges heat with the flow path 270b (the heat medium in the flow path 270b). The flow path 270b is in thermal contact with the battery 272. The flow path 270b is an example of the "first flow path" of the present disclosure.

The ECU 500 controls the thermal management circuit 100. The ECU 500 includes a processor 501, a memory 502, a storage 503, and an interface 504.

The processor 501 is, for example, a central processing unit (CPU) or a micro-processing unit (MPU). The memory 502 is, for example, a random access memory (RAM). The storage 503 is a rewritable nonvolatile memory such as a hard disk drive (HDD), a solid state drive (SSD), or a flash memory. The storage 503 stores system programs including an operating system (OS), and control programs including computer-readable codes that are necessary for control calculations. The processor 501 implements various processes by reading the system programs and the control programs, loading them into the memory 502, and executing them. The interface 504 controls communication between the ECU 500 and components of the thermal management circuit 100.

The ECU 500 generates control commands based on sensor values acquired from various sensors (e.g., battery temperature sensor 273 and heat medium temperature sensor 274) included in the thermal management circuit 100, user operations received by the HMI 600, etc., and outputs the generated control commands to the thermal management circuit 100. The ECU 500 may be divided into a plurality of ECUs, one for each function. Although FIG. 2 illustrates an example in which the ECU 500 includes one processor 501, the ECU 500 may include a plurality of processors. The same applies to the memory 502 and the storage 503.

As used herein, the "processor" is not limited to a processor in a narrow sense that performs processes by a stored program method, and may include hardwired circuitry such as an application-specific integrated circuit (ASIC) and a field-programmable gate array (FPGA). Therefore, the term "processor" may be read as processing circuitry that performs processes defined in advance by computer-readable codes and/or hardwired circuitry.

The HMI 600 is, for example, a display with a touch panel, an operation panel, or a console. The HMI 600 receives user operations for controlling the thermal management system 1. The HMI 600 outputs signals indicating user operations to the ECU 500.

The outside air temperature sensor 700 detects an outside air temperature outside the electrified vehicle 1*a*. Information on the outside air temperature detected by the outside air temperature sensor 700 is transmitted to the ECU 500.

Configuration of Thermal Management Circuit

FIG. 3 shows an example of the configuration of the thermal management circuit 100 according to the present embodiment. A heat medium circulating in the chiller circuit 210 flows through the following path: "six-way valve 380 (port P33)—water pump 211—chiller 220—six-way valve 390 (port P43)."

The water pump 211 circulates the heat medium in the chiller circuit 210 according to a control command from the ECU 500. The chiller 220 exchanges heat between the heat medium circulating in the chiller circuit 210 and the heat medium circulating in the refrigeration cycle 240. Each of the six-way valves 380, 390 switches the path to which the chiller circuit 210 is connected according to a control command from the ECU 500. The switching of the path by the six-way valves 380, 390 will be described in detail later.

The heat medium circulating in the radiator circuit 230 flows through the following path: "six-way valve 390 (port P41)—water-cooled condenser 251—radiator 231—six-way valve 390 (port P44)." The radiator 231 is disposed downstream of a grille shutter 232 (see FIG. 4), and exchanges heat between air outside the vehicle and the heat medium. The grille shutter 232 is configured to adjust an amount of heat that is dissipated from the radiator 231 to outside of the electrified vehicle 1*a*. The ECU 500 controls the opening and closing of the grille shutter 232 based on sensor values acquired from various sensors (e.g., battery temperature sensor 273 and heat medium temperature sensor 274) included in the thermal management circuit 100.

The heat medium (gas-phase refrigerant or liquid-phase refrigerant) circulating in the refrigeration cycle 240 flows through one of first to fourth paths. The first path is a path of "compressor 241—electromagnetic valve 244A—air-cooled condenser 252—check valve 248—electromagnetic valve (expansion valve) 245—evaporator 247—accumulator 249—compressor 241." The second path is a path of "compressor 241—electromagnetic valve 244A—air-cooled condenser 252—check valve 248—electromagnetic valve (expansion valve) 246—chiller 220—accumulator 249—compressor 241." The third path is a path of "compressor 241—electromagnetic valve 244B—water-cooled condenser 251—electromagnetic valve (expansion valve) 245—evaporator 247—accumulator 249—compressor 241." The fourth path is a path of "compressor 241—electromagnetic valve 244B—water-cooled condenser 251—electromagnetic valve 246—chiller 220—accumulator 249—compressor 241."

The compressor 241 compresses the gas-phase refrigerant circulating in the refrigeration cycle 240 according to a control command from the ECU 500. The electromagnetic valve 242 is connected in parallel with the compressor 241, and adjusts the amount of gas-phase refrigerant flowing into the compressor 241 according to a control command from the ECU 500. The electromagnetic valves 244 (244A, 244B)

selectively allow the gas-phase refrigerant discharged from the compressor 241 to flow into either the water-cooled condenser 251 or the air-cooled condenser 252 according to a control command from the ECU 500. The water-cooled condenser 251 exchanges heat between the gas-phase refrigerant discharged from the compressor 241 and the heat medium flowing in the radiator circuit 230. The air-cooled condenser 252 exchanges heat with air introduced into a vehicle cabin to produce warm air. The electromagnetic valve 245 restricts the flow of the liquid-phase refrigerant into the evaporator 247 according to a control command from the ECU 500. The electromagnetic valve 246 restricts the flow of the liquid-phase refrigerant into the chiller 220 according to a control command from the ECU 500. The electromagnetic valves 245, 246 also have a function to expand the liquid-phase refrigerant. The accumulator 249 removes the liquid-phase refrigerant from the refrigerant in a gas-liquid mixed state. The accumulator 249 thus reduces or eliminates the possibility that the liquid-phase refrigerant may be sucked into the compressor 241 when the refrigerant is not completely evaporated by the evaporator 247.

The heat medium (coolant) circulating in the drive unit circuit 260 flows through the following path: "six-way valve 390 (port P42)—reservoir tank 265—water pump 261—SPU 262—PCU 263—oil cooler 264—six-way valve 380 (port P32)."

The water pump 261 circulates the heat medium in the drive unit circuit 260 according to a control command from the ECU 500. The SPU 262 controls charge and discharge of the battery 272 according to a control command from the ECU 500. The PCU 263 converts direct current (DC) power supplied from the battery 272 to alternating current (AC) power to supply the AC power to a motor (not shown) contained in a transaxle according to a control command from the ECU 500. The oil cooler 264 cools the transaxle through heat exchange between the heat medium circulating in the drive unit circuit 260 and lubricating oil for the motor. Heat exchange may be performed between heat generated by supplying electric power to a stator of the motor without rotating a rotor of the motor and the heat medium circulating in the drive unit circuit 260.

The SPU 262, the PCU 263, and the oil cooler 264 are cooled by the heat medium circulating in the drive unit circuit 260. The reservoir tank 265 stores part of the heat medium circulating in the drive unit circuit 260 (heat medium that has overflowed due to a pressure increase) to maintain the pressure and amount of heat medium in the drive unit circuit 260.

The heat medium (coolant) circulating in the battery circuit 270 flows through the following path: "six-way valve 380 (port P31)—ADAS 271—battery 272—six-way valve 380 (port P34)."

The ADAS 271 includes, for example, adaptive cruise control (ACC), auto speed limiter (ASL), lane keeping assist (LKA), pre-crash safety (PCS), and lane departure alert (LDA). The battery circuit 270 may include an autonomous driving system (ADS) in addition to the ADAS 271. The battery 272 supplies electric power for traveling to the motor contained in the transaxle. The battery temperature sensor 273 detects the temperature of the battery 272.

The heat medium temperature sensor 274 detects the temperature of the heat medium in the flow path 270*b* where the battery 272 is provided. For example, the heat medium temperature sensor 274 detects the temperature of the heat medium flowing between the battery 272 and the six-way valve 380 (downstream of the battery 272). The heat medium temperature sensor 274 may detect the temperature of the heat medium, for example, between the battery 272 and the ADAS 271.

Communication Patterns

Figure 4:
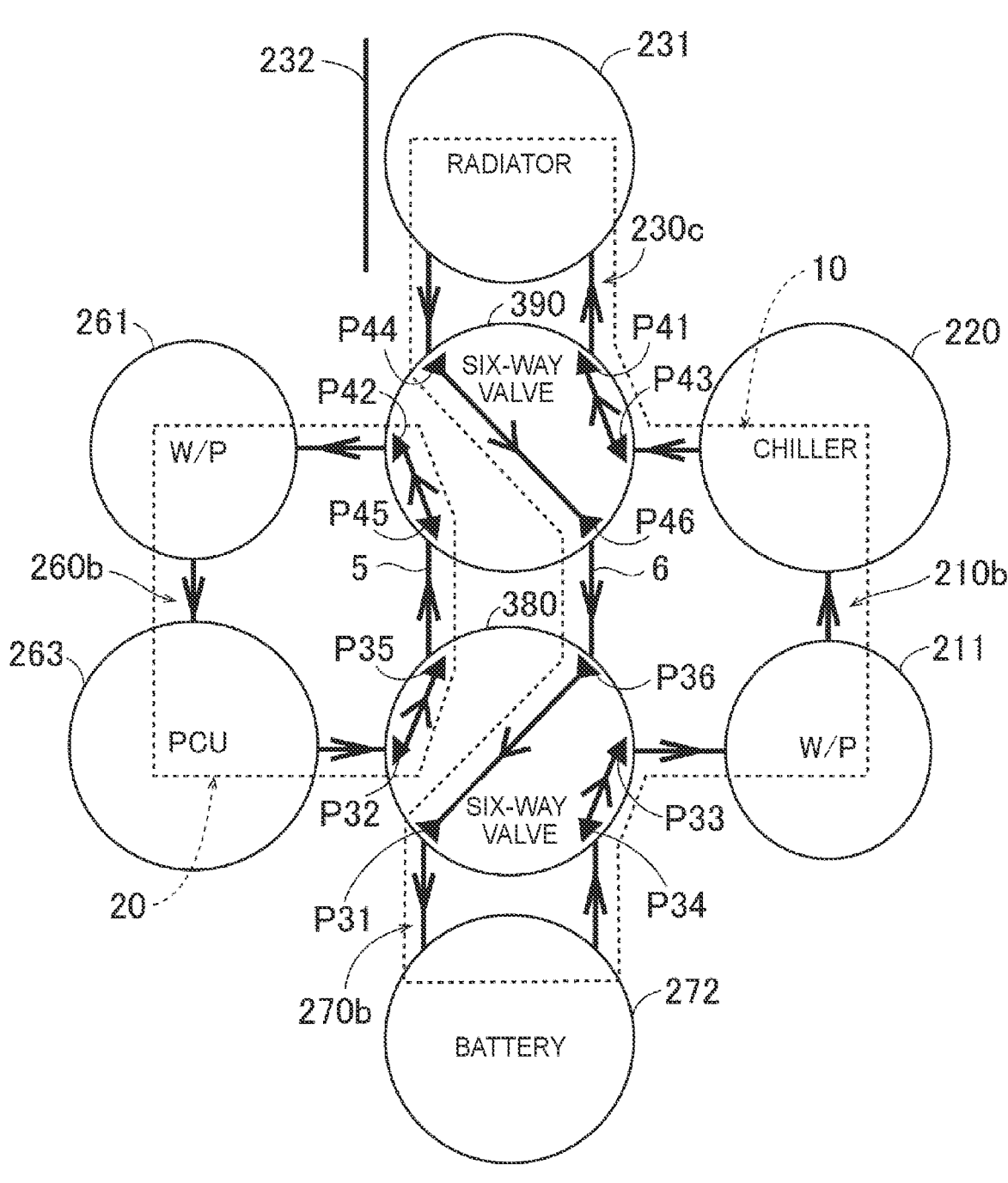
FIG. 4 shows a first communication pattern of a thermal management circuit according to the embodiment.
Figure 5:
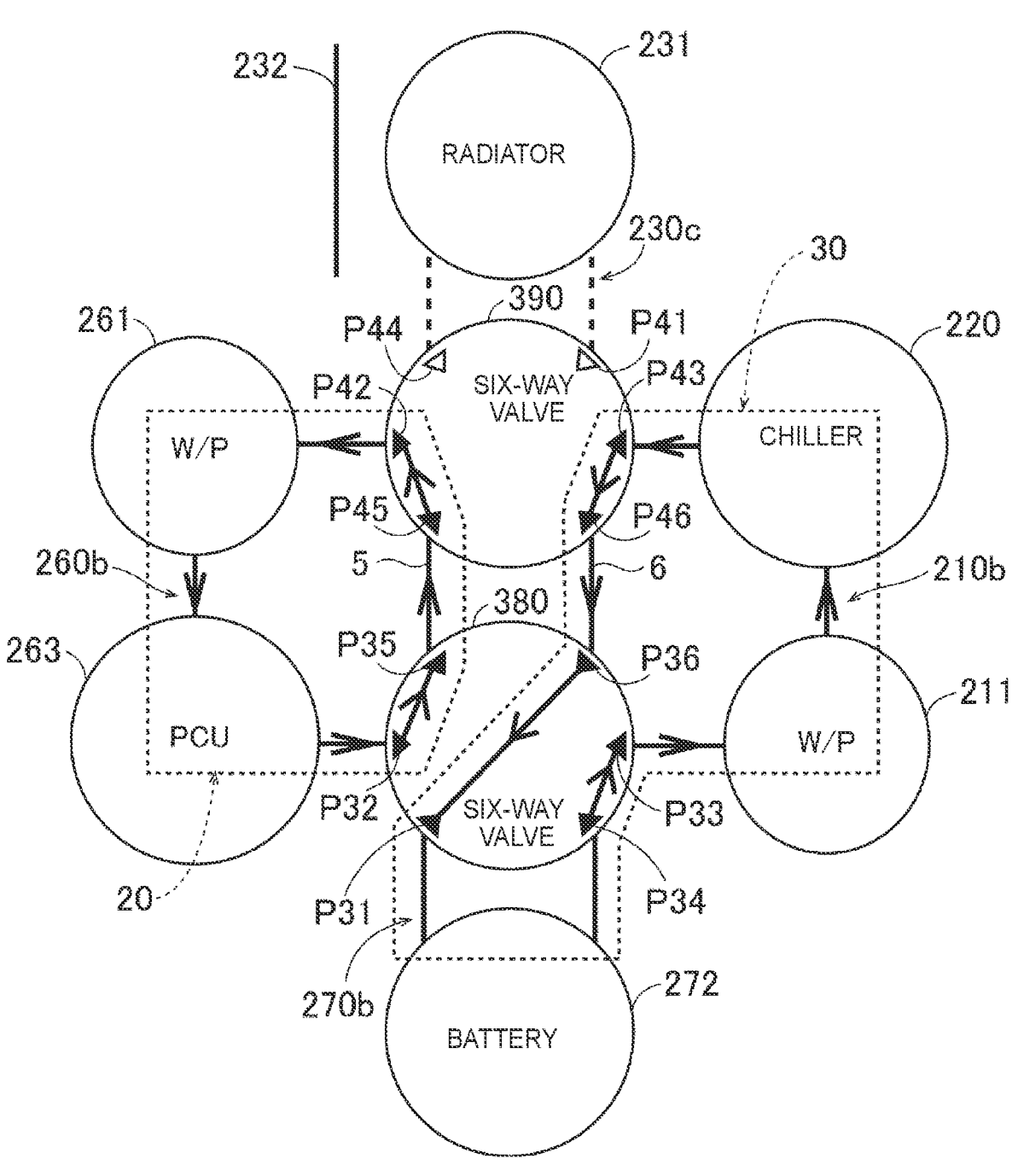
FIG. 5 shows a second communication pattern of the thermal management circuit according to the embodiment.

FIGS. 4 and 5 are conceptual diagrams showing an overview of first and second communication patterns of the thermal management circuit 100 that are formed by controlling the six-way valve 380 and the six-way valve 390. The first communication pattern is an example of the "heating circuit" of the present disclosure.

In the first communication pattern shown in FIG. 4, the six-way valve 380 forms a path communicating between the port P31 and the port P36, a path communicating between the port P33 and the port P34, and a path communicating between the port P32 and the port P35.

In the first communication pattern, the six-way valve 390 forms a path communicating between the port P42 and the port P45, a path communicating between the port P44 and the port P46, and a path communicating between the port P41 and the port P43.

In the first communication pattern, a path communicating between the port P35 and the port P45 (flow path 5) and a path communicating between the port P36 and the port P46 (flow path 6) are formed.

The flow path 230c where the radiator 231 is provided, the flow path 270b where the battery 272 is provided, the flow path 210b where the chiller 220 is provided, the six-way valve 380, and the six-way valve 390 are thus connected. As a result, the heat medium flows through a first closed circuit 10 of "water pump 211—chiller 220—six-way valve 390—radiator 231—six-way valve 390—six-way valve 380—battery 272—six-way valve 380—water pump 211." The heat medium also flows through a second closed circuit 20 of "water pump 261—PCU 263—six-way valve 380—six-way valve 390—water pump 261." The first closed circuit 10 and the second closed circuit 20 (flow path 260b) are disconnected from and independent of each other. The first closed circuit 10 is an example of the "connection flow path" of the present disclosure.

In the second communication pattern shown in FIG. 5, the six-way valve 380 forms a path communicating between the port P32 and the port P35, a path communicating between the port P31 and the port P36, and a path communicating between the port P33 and the port P34.

In the second communication pattern, the six-way valve 390 forms a path communicating between the port P42 and the port P45 and a path communicating between the port P43 and the port P46.

In the second communication pattern, a path communicating between the port P35 and the port P45 (flow path 5) and a path communicating between the port P36 and the port P46 (flow path 6) are formed.

The flow path 270b where the battery 272 is provided, the flow path 210b where the chiller 220 is provided, the six-way valve 380, and the six-way valve 390 are thus connected. As a result, the heat medium flows through a third closed circuit 30 of "water pump 211—chiller 220—six-way valve 390—six-way valve 380—battery 272—six-way valve 380—water pump 211." At this time, the second closed circuit 20 is also formed. The second closed circuit 20 and the third closed circuit 30 are disconnected from and independent of each other.

Method for Controlling Thermal Management Circuit

A method for controlling the thermal management system 1 (heating control) will be described with reference to the flowcharts of FIGS. 6 and 7. The flowcharts show only an example and the present disclosure is not limited to this example.

Figure 6:
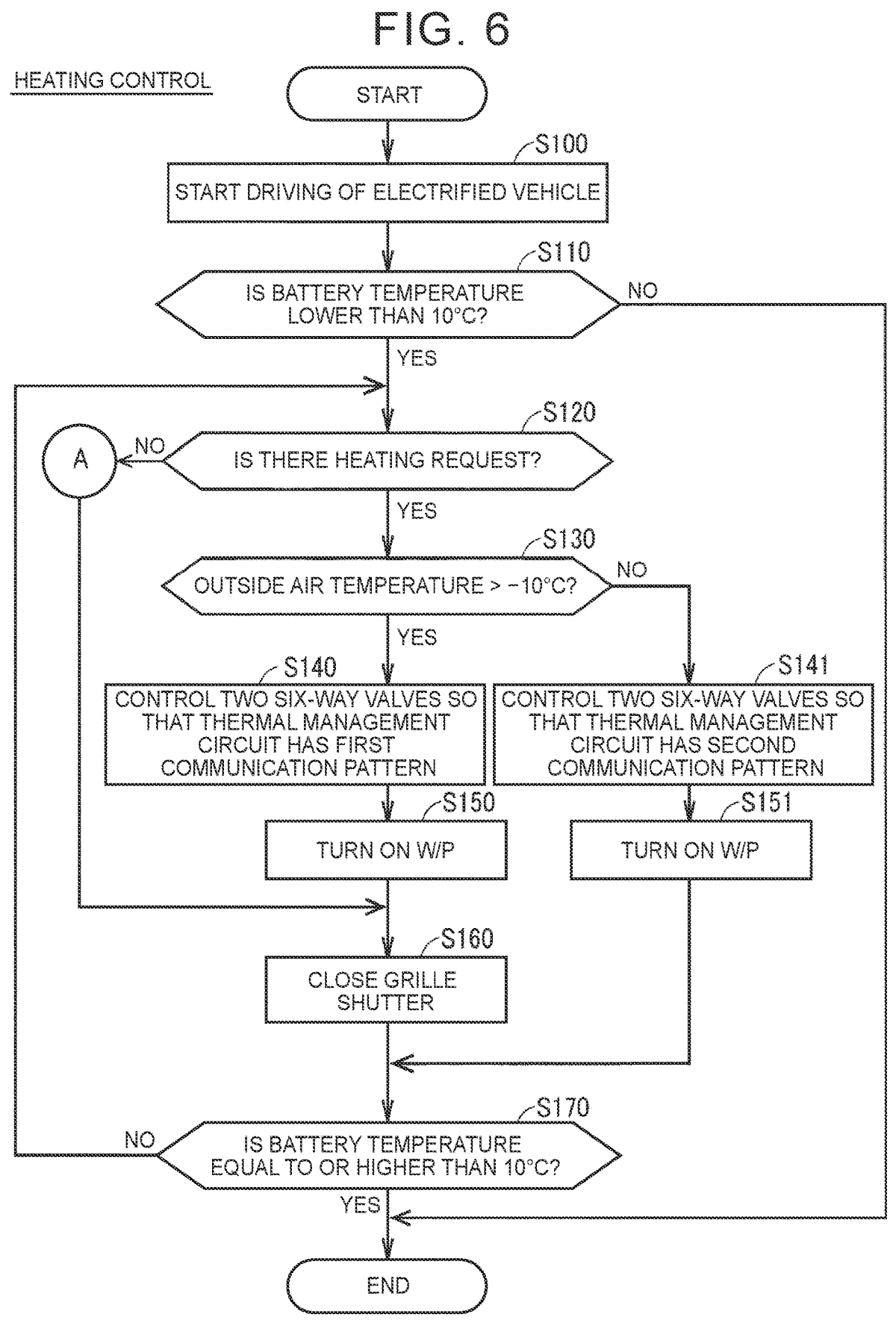

As shown in FIG. 6, in step S100, driving of the electrified vehicle 1a is started (a traveling system is activated). Specifically, a start button (not shown) of the electrified vehicle 1a is pressed to drive the PCU 263 etc., and the PCU 263 and the battery 272 are electrically connected (by a system main relay (SMR) (not shown)). A current is thus supplied from the PCU 263 to the battery 272. By receiving a predetermined internal signal of the electrified vehicle 1a, the ECU 500 detects that driving of the electrified vehicle 1a has been started.

In step S110, the ECU 500 determines whether the temperature of the battery 272 detected by the battery temperature sensor 273 is lower than 10° C. When the temperature of the battery 272 is lower than 10° C. (Yes in S110), the process proceeds to step S120. When the temperature of the battery 272 is equal to or higher than 10° C. (No in S110), the process ends. The threshold in step S110 may be a value other than 10° C.

In step S120, the ECU 500 determines whether a request to turn on a heater is given from the user of the electrified vehicle 1a. When the request is given (Yes in S120), the process proceeds to step S130. When the request is not given (No in S120), the process proceeds to a flow A. Details of the flow A will be described later with reference to FIG. 7. The ECU 500 may determine whether the request is given based on a signal that is sent to the ECU 500 when the user presses a button for turning on the heater.

In step S130, the ECU 500 determines whether the outside air temperature detected by the outside air temperature sensor 700 is higher than −10° C. When the outside air temperature is higher than −10° C. (Yes in S130), the process proceeds to step S140. When the outside air temperature is equal to or lower than −10° C. (No in S130), the process proceeds to step S141. The threshold of −10° C. is set based on the fact that the heat medium is cooled to about −10° C. by being expanded by the electromagnetic valve 246 (expansion valve). The temperature of −10° C. is an example of the "predetermined threshold" of the present disclosure.

In step S140, the ECU 500 controls the six-way valve 380 and the six-way valve 390 so that the thermal management circuit 100 has the first communication pattern shown in FIG. 4. At this time, the ECU 500 may set the flow rate of the water pump 261 to be relatively high (e.g., to an upper limit value). The process then proceeds to step S150.

In step S141, the ECU 500 controls the six-way valve 380 and the six-way valve 390 so that the thermal management circuit 100 has the second communication pattern shown in FIG. 5. At this time, the ECU 500 may set the flow rate of the water pump 261 to be relatively high (e.g., to the upper limit value). The process then proceeds to step S151.

In step S150, the ECU 500 turns on the water pump 211. The heat medium thus circulates through the first closed circuit 10 (see FIG. 4). As a result, the heating control using the radiator 231 and the chiller 220 can be supported by heat from the battery 272. When the water pump 211 is already on, the ECU 500 keeps the water pump 211 on. The process then proceeds to step S160.

In step S151, the ECU 500 turns on the water pump 211. The heat medium thus circulates through the third closed circuit 30 (see FIG. 5). When the water pump 211 is already on, the ECU 500 keeps the water pump 211 on. The process then proceeds to step S170.

In step S160, the ECU 500 controls the grille shutter 232 to close. When the grille shutter 232 is already closed, the ECU 500 keeps the grille shutter 232 closed. The process then proceeds to step S170.

In step S170, the ECU 500 determines whether the temperature of the battery 272 detected by the battery temperature sensor 273 is equal to or higher than 10° C. When the temperature of the battery 272 is equal to or higher than 10° C. (Yes in S170), the process ends. When the temperature of the battery 272 is lower than 10° C. (No in S170), the process returns to step S120. The threshold in step S170 may be a value other than 10° C. as long as it is equal to or higher than the threshold in step S110.

Process of Flow A

Figure 7:
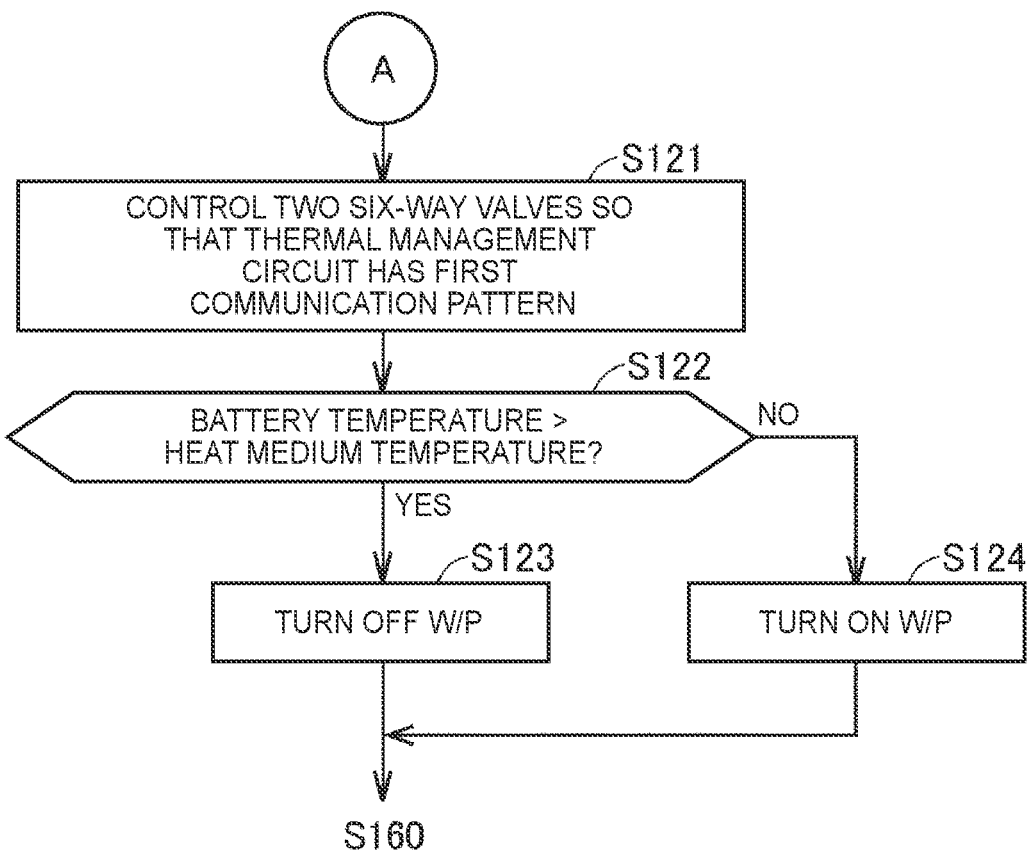
FIG. 7 is a flowchart showing a process of a flow A in FIG. 6.

As shown in FIG. 7, in step S121, the ECU 500 controls the six-way valve 380 and the six-way valve 390 so that the thermal management circuit 100 has the first communication pattern shown in FIG. 4. At this time, the ECU 500 may set the flow rate of the water pump 261 to be relatively high (e.g., to the upper limit value). The process then proceeds to step S122.

In step S122, the ECU 500 determines whether the temperature of the battery 272 detected by the battery temperature sensor 273 is higher than the temperature of the heat medium detected by the heat medium temperature sensor 274. When the temperature of the battery 272 is higher than the temperature of the heat medium (Yes in S122), the process proceeds to step S123. When the temperature of the battery 272 is equal to or lower than the temperature of the heat medium (No in S122), the process proceeds to step S124.

In step S123, the ECU 500 turns off the water pump 211. It is thus possible to reduce or eliminate the possibility of heat being taken from the battery 272 by the heat medium. When the water pump 211 is already off, the ECU 500 keeps the water pump 211 off. The process then proceeds to step S160 (see FIG. 6).

In step S124, the ECU 500 turns on the water pump 211. It is thus possible to apply heat from the heat medium to the battery 272. When the water pump 211 is already on, the ECU 500 keeps the water pump 211 on. The process then proceeds to step S160 (see FIG. 6).

Control Flow During Non-Heating Control

Figure 8:
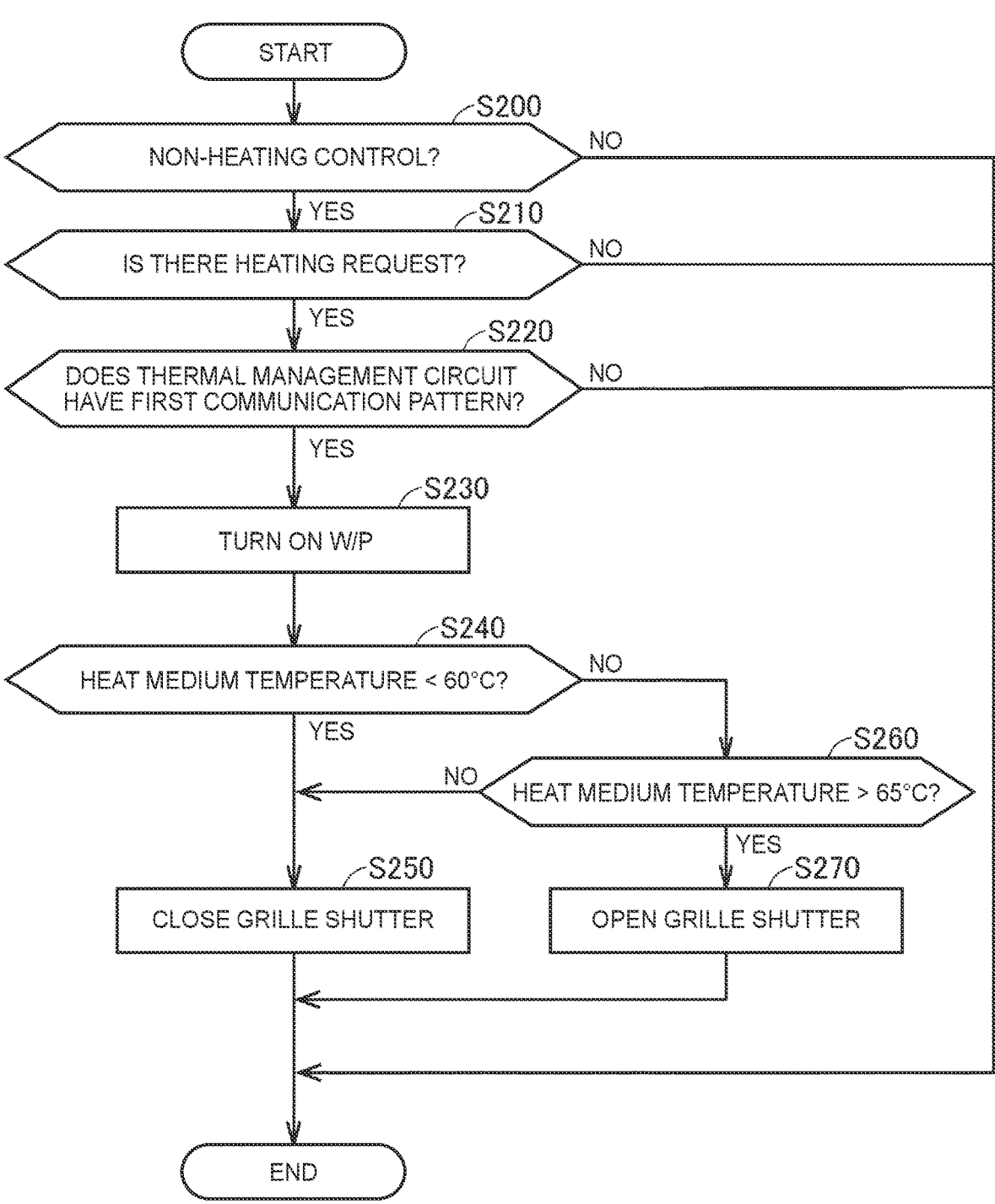
FIG. 8 is a flowchart showing an example of a process during non-heating control that is performed by the thermal management system according to the embodiment.

Next, opening and closing control on the grille shutter 232 during non-heating control will be described with reference to FIG. 8. The control flow in FIG. 8 may be performed at predetermined time intervals (e.g., every 10 minutes).

In step S200, the ECU 500 determines whether the current time is a time under non-heating control. That is, the ECU 500 determines whether the control shown in FIGS. 6 and 7 is not being performed. When the current time is the time under non-heating control (Yes in S200), the process proceeds to step S210. When the current time is not the time under non-heating control (No in S200), the process ends.

In step S210, the ECU 500 determines whether a request to turn on the heater is given from the user of the electrified vehicle 1a. When the request is given (Yes in S210), the process proceeds to step S220. When the request is not given (No in S210), the process ends.

In step S220, the ECU 500 determines whether the thermal management circuit 100 has the first communication pattern shown in FIG. 4. When the thermal management circuit 100 has the first communication pattern (Yes in S220), the process proceeds to step S230. When the thermal management circuit 100 does not have the first communication pattern (No in S220), the process ends.

In step S230, the ECU 500 turns on the water pump 211. The heat medium thus circulates through the first closed circuit 10. When the water pump 211 is already on, the ECU 500 keeps the water pump 211 on.

In step S240, the ECU 500 determines whether the temperature of the heat medium detected by the heat medium temperature sensor 274 is lower than 60° C. When the temperature of the heat medium is lower than 60° C. (Yes in S240), the process proceeds to step S250. When the temperature of the heat medium is equal to or higher than 60° C. (No in S240), the process proceeds to step S260. The threshold in step S240 may be a value other than 60° C.

In step S250, the ECU 500 controls the grille shutter 232 to close. When the grille shutter 232 is already closed, the ECU 500 keeps the grille shutter 232 closed. The process then ends.

In step S260, the ECU 500 determines whether the temperature of the heat medium detected by the heat medium temperature sensor 274 is higher than 65° C. When the temperature of the heat medium is higher than 65° C. (Yes in S260), the process proceeds to step S270. When the temperature of the heat medium is equal to or lower than 65° C. (No in S260), the process proceeds to step S250. The threshold in step S260 may be a value other than 65° C. as long as it is higher than the threshold in step S240 (60° C.) by several degrees Celsius (e.g., 10° C. or less).

In step S270, the ECU 500 controls the grille shutter 232 to open. When the grille shutter 232 is already open, the ECU 500 keeps the grille shutter 232 open. The process then ends. By providing the difference between the threshold in step S240 and the threshold in step S260, it is possible to reduce or eliminate the possibility that the open/closed state of the grille shutter 232 is changed frequently.

As described above, in the present embodiment, the ECU 500 controls the six-way valves 380, 390 so that the first closed circuit 10 (flow path 270b, flow path 210b, and flow path 230c) and the second closed circuit 20 (flow path 260b) are disconnected from and independent of each other during the heating control of the battery 272. It is thus possible to reduce or eliminate the possibility that the heat generated by the PCU 263 etc. may be taken by the chiller 220 and the radiator 231. As a result, it is possible to perform heating of the battery 272 while allowing effective use of the heat generated by the PCU 263 etc.

The above embodiment illustrates an example in which heating control of the battery 272 is performed at the start of driving the electrified vehicle 1a (when the traveling system is activated). However, the present disclosure is not limited to this. The heating control may be started a predetermined time (e.g., 30 minutes) before the scheduled start time of the following trip. In these cases, control may be performed so that no torque is generated in the motor of the electrified vehicle 1a (e.g., control for causing only one phase of current to flow among three phases of current supplied to the motor).

Figure 9:
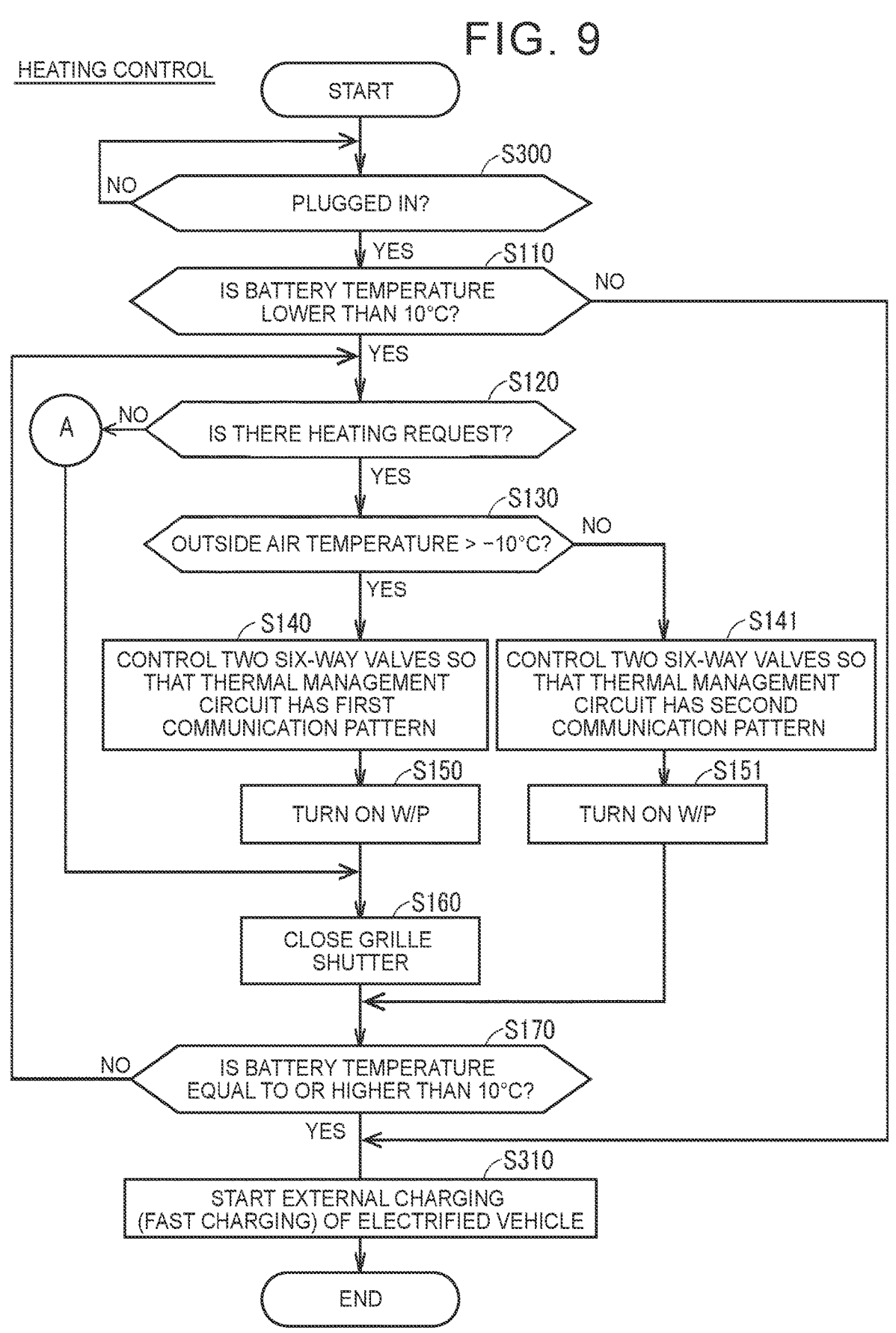
FIG. 9 is a flowchart showing control that is performed by the thermal management system according to a modification of the embodiment.

As shown in FIG. 9, the heating control may be performed at the start of external charging (e.g., fast charging). External charging refers to charging the battery with charging power supplied from charging equipment (not shown) external to the electrified vehicle. For example, when the ECU 500 detects a charging plug plugged in step S300, the process proceeds to step S110. When it is determined in step S170 or S110 that the temperature of the battery 272 is equal to or higher than 10° C., the process proceeds to step S310. The temperature of 10° C. is an example of the "predetermined temperature" of the present disclosure. In step S310, the ECU 500 starts controlling external charging (fast charging).

FIG. 9 illustrates an example in which plugging in triggers the battery heating control. However, the battery heating control may be started before plugging in. For example, the battery heating control may be started a predetermined time (e.g., 10 minutes) before the scheduled start time of external charging (scheduled start time of supplying charging power). The heating control may be performed at the start of normal charging (low-speed charging at a lower charging rate than that of fast charging).

The above embodiment illustrates an example in which the thermal management system 1 is provided in the electrified vehicle 1a. However, the present disclosure is not limited to this. The thermal management system 1 may be provided in an electrical apparatus different from the electrified vehicle 1a (e.g., a stationary electrical storage device).

The above embodiment illustrates an example in which the first communication pattern and the second communication pattern are switched depending on the outside air temperature when the heating request is given. However, the present disclosure is not limited to this. For example, the first communication pattern may be formed regardless of the outside air temperature.

The above embodiment illustrates an example in which the water pump 211 is controlled based on the magnitude relationship between the temperature of the battery 272 and the temperature of the heat medium in the flow path 270b when the heating request is not given. However, the present disclosure is not limited to this. For example, the water pump 211 may be turned on regardless of the magnitude relationship between the temperature of the battery 272 and the temperature of the heat medium in the flow path 270b.

The above embodiment illustrates an example in which the heating control of the battery 272 is performed at the start of driving of the electrified vehicle 1a (when the traveling system is activated). However, the present disclosure is not limited to this. The heating control may be performed other than at the start of driving of the electrified vehicle 1a (when the traveling system is activated). For example, the heating control may be performed when the temperature of the battery 272 falls below a predetermined threshold (10° C. in the above embodiment). In this case, the ECU 500 may acquire the detected value of the temperature of the battery 272 at predetermined intervals (e.g., every hour). The battery may be heated by causing a current larger than normal to flow through the battery with the first communication pattern formed during traveling of the electrified vehicle 1a.

Figure 10:
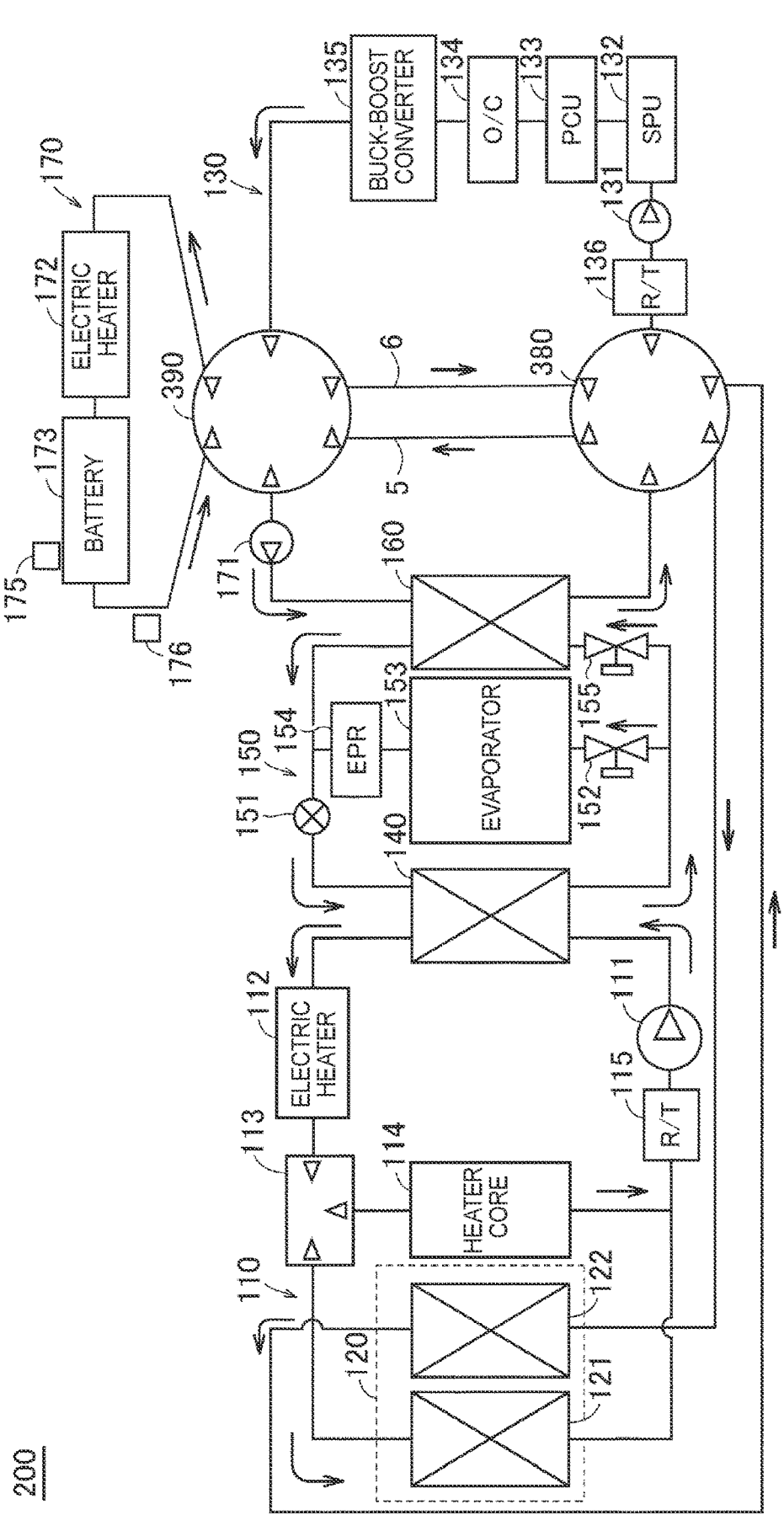
FIG. 10 shows the configuration of a thermal management system according to a modification of the embodiment.

A high temperature circuit 110 shown in FIG. 10 may be provided in the thermal management circuit including the six-way valves 380, 390 as in the above embodiment. Specifically, a thermal management circuit 200 includes, for example, the high temperature circuit 110, a radiator 120, a low temperature circuit 130, a condenser 140, a refrigeration cycle 150, a chiller 160, a battery circuit 170, the six-way valve 380, and the six-way valve 390. The chiller 160 is an example of the "chiller device" of the present disclosure.

The high temperature circuit 110 includes, for example, a water pump (W/P) 111, an electric heater 112, a three-way valve 113, a heater core 114, and a reservoir tank (R/T) 115. The heater core 114 is an example of the "air conditioning circuit" of the present disclosure.

The radiator 120 includes a high temperature (HT) radiator 121 and a low temperature (LT) radiator 122. The low temperature radiator 122 is an example of the "radiator" of the present disclosure.

The low temperature circuit 130 includes, for example, a water pump 131, an SPU 132, a PCU 133, an oil cooler 134, a buck-boost converter 135, and a reservoir tank 136. The PCU 133 and the oil cooler 134 are examples of the "drive device" of the present disclosure.

The refrigeration cycle 150 includes, for example, a compressor 151, an expansion valve 152, an evaporator 153, an evaporative pressure regulator (EPR) 154, and an expansion valve 155.

The battery circuit 170 includes, for example, a water pump 171, an electric heater 172, a battery 173, a battery temperature sensor 175, and a heat medium temperature sensor 176. The battery 173 and the water pump 171 are examples of the "electrical storage device" and the "pump" of the present disclosure, respectively. The battery temperature sensor 175 and the heat medium temperature sensor 176 are examples of the "first temperature sensor" and the "second temperature sensor" of the present disclosure, respectively.

The configurations (processes) of the above embodiment and modifications may be combined.

Figure 11:
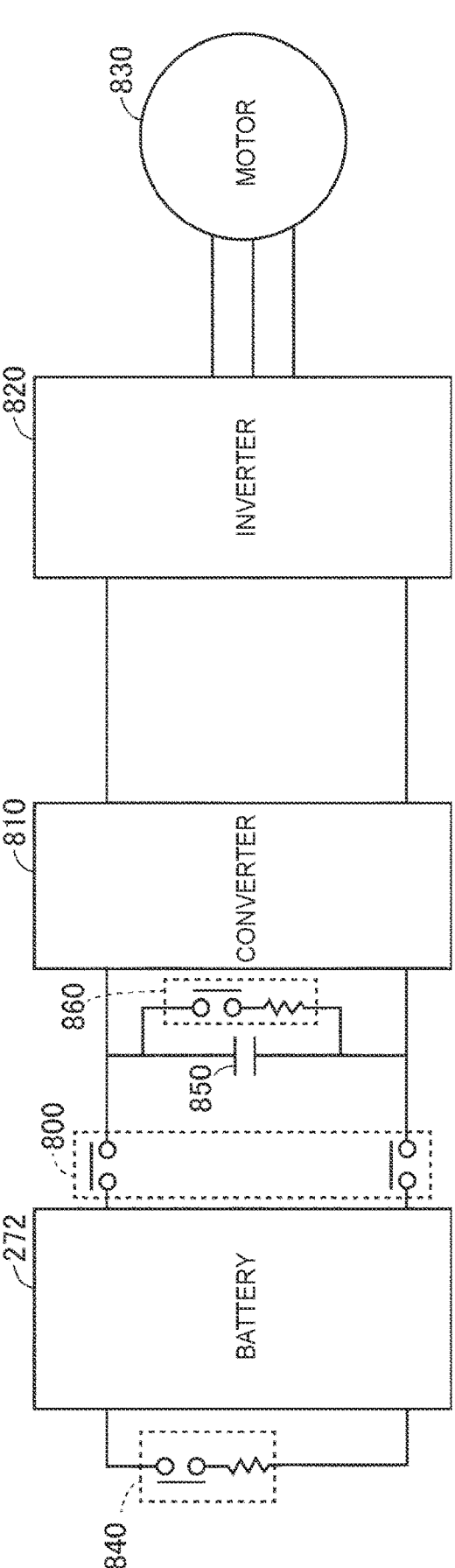
FIG. 11 shows a circuit configuration including a battery, a converter, an inverter, and a motor.

The heating control of the battery will be described in detail with reference to FIG. 11. The battery 272 is connected to a converter 810 via a system main relay (SMR) 800. The converter 810 is connected to an inverter 820. The inverter 820 is connected to a motor 830. A discharge circuit 840 including a switch and a resistive element is connected to the battery 272. A smoothing capacitor 850 is provided between the battery 272 and the converter 810. A discharge circuit 860 composed of a switch and a resistive element is connected in parallel with the smoothing capacitor 850.

The heating control of the battery 272 may include, for example, control for electrically disconnecting the SMR 800 and turning on the switch of the discharge circuit 840. A current thus flows through a closed circuit formed by the battery 272 and the discharge circuit 840. The heating control of the battery 272 may include control for turning off the switch of the discharge circuit 840 and turning on the SMR 800 and the switch of the discharge circuit 860. A current thus flows through a closed circuit formed by the battery 272, the SMR 800, and the discharge circuit 860. The heating control of the battery 272 may include control for turning on the SMR 800 and turning off the switches of the discharge circuits 840, 860 to cause a current adjusted so that no torque is generated in the motor 830 to flow.

The embodiment disclosed herein should be construed as illustrative in all respects and not restrictive. The scope of the present disclosure is set forth in the claims rather than in the above description of the embodiment, and is intended to include all modifications within the meaning and scope equivalent to those of the claims.

What is claimed is:

1. A thermal management system provided in an electrical apparatus, the thermal management system comprising:
 a first flow path, a second flow path, a third flow path, and a fourth flow path each configured to allow a heat medium to flow through the flow path;
 an electrical storage device configured to exchange heat with the heat medium in the first flow path;
 a drive device configured to exchange heat with the heat medium in the second flow path and generate a driving force;
 a radiator provided on the third flow path;
 a chiller device provided on the fourth flow path; and
 a switching device configured to switch a connection state between the first flow path, the second flow path, the third flow path, and the fourth flow path, wherein:

the switching device is configured to provide a heating circuit when performing heating of the electrical storage device by a current flowing through the electrical storage device; and the heating circuit is a flow path circuit in which a connection flow path and the second flow path are disconnected from and independent of each other, and the connection flow path connects the first flow path, the third flow path, and the fourth flow path.

2. The thermal management system according to claim 1, wherein:

the electrical apparatus is an electrified vehicle; and the electrical storage device is configured to be heated when a traveling system of the electrified vehicle is activated.

3. The thermal management system according to claim 1, wherein:

the electrical storage device is configured to be charged from an outside with charging power supplied from charging equipment external to the electrical apparatus; and the electrical storage device is configured to be heated at start of charging from the outside to cause a temperature of the electrical storage device to reach a predetermined temperature or higher.

4. The thermal management system according to claim 1, wherein:

the electrical apparatus is an electrified vehicle;

the chiller device is configured to exchange heat with an air conditioning circuit configured to adjust a cabin temperature of the electrified vehicle; and the switching device is configured to provide the heating circuit under a condition that an outside air temperature is higher than a predetermined threshold in response to a heating request using the air conditioning circuit when performing the heating of the electrical storage device.

5. The thermal management system according to claim 4, further comprising a control device configured to control the switching device, wherein:

the switching device includes a first six-way valve and a second six-way valve;

the first flow path connects the electrical storage device and the first six-way valve;

the second flow path connects the drive device to each of the first six-way valve and the second six-way valve;

the third flow path connects the radiator and the second six-way valve;

the fourth flow path connects the chiller device to each of the first six-way valve and the second six-way valve; and the control device is configured to control the first six-way valve and the second six-way valve to provide closed circuits in the heating circuit under the condition that the outside air temperature is higher than the predetermined threshold in response to the heating request using the air conditioning circuit when performing the heating of the electrical storage device, the closed circuits including:

(i) a first closed circuit connecting the third flow path, the first flow path, the fourth flow path, the second six-way valve, and the first six-way valve, the heat medium circulating through the first closed circuit exchanging heat with the chiller device, the radiator, and the electrical storage device; and (ii) a second closed circuit connecting the second flow path, the first six-way valve, and the second six-way valve, the heat medium circulating through the second closed circuit exchanging heat with the drive device.

6. The thermal management system according to claim 4, further comprising a control device configured to control the switching device, wherein:

the switching device includes a first six-way valve and a second six-way valve;

the first flow path connects the electrical storage device and the first six-way valve;

the second flow path connects the drive device to each of the first six-way valve and the second six-way valve;

the third flow path connects the radiator and the second six-way valve;

the fourth flow path connects the chiller device to each of the first six-way valve and the second six-way valve; and the control device is configured to control the first six-way valve and the second six-way valve to provide closed circuits in the heating circuit under a condition that the outside air temperature is not higher than the predetermined threshold in response to the heating request using the air conditioning circuit when performing the heating of the electrical storage device, the closed circuits including:

(ii) a second closed circuit connecting the second flow path, the first six-way valve, and the second six-way valve, the heat medium circulating through the second closed circuit exchanging heat with the drive device; and (iii) a third closed circuit connecting the first flow path, the fourth flow path, the first six-way valve, and the second six-way valve, the heat medium circulating through the third closed circuit exchanging heat with the chiller device and the electrical storage device.

7. The thermal management system according to claim 4, further comprising:

a pump provided on the fourth flow path and configured to circulate the heat medium;

a first temperature sensor configured to detect a temperature of the electrical storage device; and a second temperature sensor configured to detect a temperature of the heat medium in the first flow path, wherein the pump is configured to, in a case where the heating request is not given when performing the heating of the electrical storage device with the heating circuit provided:

stop when a detected value of the first temperature sensor is higher than a detected value of the second temperature sensor; and operate when the detected value of the first temperature sensor is equal to or lower than the detected value of the second temperature sensor.

8. The thermal management system according to claim 1, wherein:

the electrical apparatus is an electrified vehicle;

the thermal management system further includes a grille shutter configured to open and close and adjust an amount of heat that is dissipated from the radiator to an outside of the electrified vehicle; and the grille shutter is configured to close when performing the heating of the electrical storage device with the heating circuit provided.

9. The thermal management system according to claim 1, further comprising a control device configured to control the switching device, wherein:

the switching device includes a first six-way valve and a second six-way valve;

the first flow path connects the electrical storage device and the first six-way valve;

the second flow path connects the drive device to each of the first six-way valve and the second six-way valve;

the third flow path connects the radiator and the second six-way valve;

the fourth flow path connects the chiller device to each of the first six-way valve and the second six-way valve; and the control device is configured to control the first six-way valve and the second six-way valve to provide closed circuits in the heating circuit, the closed circuits including:

(i) a first closed circuit connecting the third flow path, the first flow path, the fourth flow path, the second six-way valve, and the first six-way valve, the heat medium circulating through the first closed circuit exchanging heat with the chiller device, the radiator, and the electrical storage device;

(ii) a second closed circuit connecting the second flow path, the first six-way valve, and the second six-way valve, the heat medium circulating through the second closed circuit exchanging heat with the drive device; and (iii) a third closed circuit connecting the first flow path, the fourth flow path, the first six-way valve, and the second six-way valve, the heat medium circulating through the third closed circuit exchanging heat with the chiller device and the electrical storage device.

\* \* \* \* \*